Aug. 8, 1944.　　　W. E. RANEY　　　2,355,558
DIRECT DRIVE ELECTRIC POWER TOOL
Filed April 22, 1943　　　2 Sheets-Sheet 1
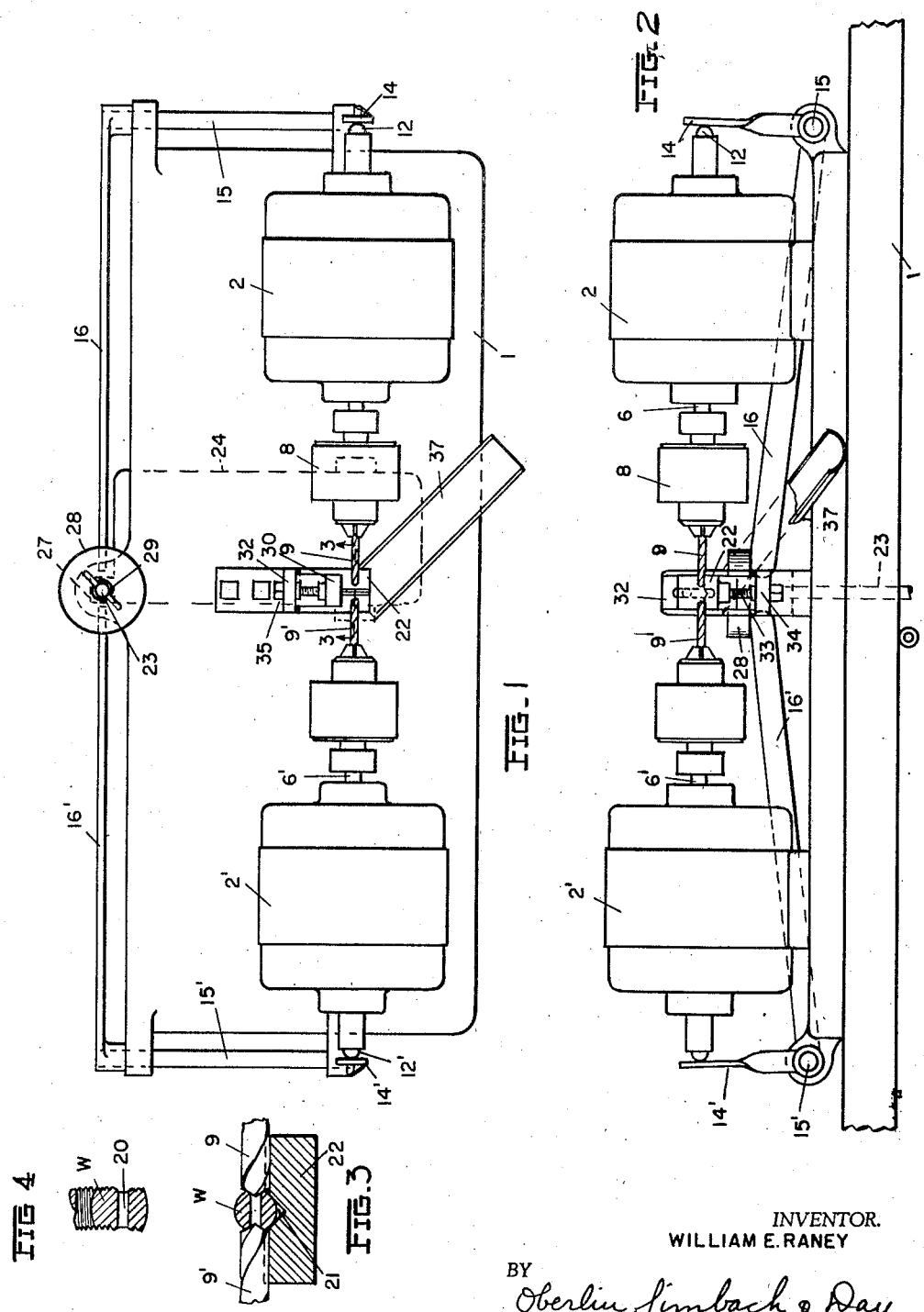
INVENTOR.
WILLIAM E. RANEY
BY Oberlin, Limbach & Day
ATTORNEYS Aug. 8, 1944. W. E. RANEY 2,355,558
DIRECT DRIVE ELECTRIC POWER TOOL
Filed April 22, 1943 2 Sheets-Sheet 2

INVENTOR.
WILLIAM E. RANEY
BY Oberlin, Limbach & Day
ATTORNEYS

Patented Aug. 8, 1944

2,355,558

UNITED STATES PATENT OFFICE 2,355,558

DIRECT DRIVE ELECTRIC POWER TOOL

William E. Raney, Shaker Heights, Ohio, assignor of one-half to Woods King, Mentor, Ohio Application April 22, 1943, Serial No. 484,083

2 Claims. (Cl. 77—21)

The present invention relates to a machine tool of the type wherein the cutting tool element is dependent upon both a rotary drive motion and an axial thrust force in order to accomplish its operative function. My invention is, therefore, particularly adapted to the operation of such cutting tools as drills, reamers, counterbores, mills, chamfers, grinding wheels, and the like, whose cutting function is dependent both upon a rotary drive and an axial thrust.

It is known in the electric motor art, that in addition to the rotary or turning torque generated between the stator and the rotor (e. g., the stationary field windings and the armature and its shaft), that a solenoid effect is exerted upon the rotor and the motor drive shaft, tending to pull the latter into a fixed axial position coinciding with the zone of maximum magnetic flux of the field. Thus, where the rotor of an electric motor is axially shiftable, or mounted upon a "floating" axis, the application of electric current to the motor will draw the rotor and drive shaft from an outer axial position to a given, fixed axial position wherein the rotor and the shaft are in radial alignment with the field coils, much in the manner in which the core or plunger of an electric solenoid is drawn into a neutral position within the convolutions of the solenoid coil when the electro-magnetic flux is exerted.

It is the general object and nature of my present invention to utilize this solenoid effect between the stator and rotor of an electric motor, to effect the retractive movement or "outfeed" of a cutting tool of the nature first above described, to carry the cutting tool directly upon the electric motor drive shaft for the required rotary driving force, and to apply a positive mechanical force directly upon the axis of the rotor shaft for the axial traversing movement or "infeed" of the cutting tool. The axially applied mechanical force for tool infeed is sufficient to overcome the outfeed or retractive force of the solenoid effect upon the floating rotor shaft, and hence the axial tool feeding movement is exerted against a constant retractive force which becomes immediately operative upon release of the mechanical, infeeding force.

By effecting the infeeding or axial working traverse of the tool drive shaft and rotor in a direction out of the zone of maximum field flux, there is thereby provided an automatic speed regulation of the cutting tool in direct proportion to the depth of cut. As a cutting tool, such as a drill, cuts progressively deeper into the hole which it is cutting, it is desirable to slow down its rotary speed in order to prevent overheating of the cutting edges of the tool. As the rotor of an electric motor is moved further out of the zone of maximum magnetic field flux, the driving torque thereon becomes less. Hence, according to my invention, the cutting tool rotating speed is automatically reduced in proportion to its amount of infeeding advance.

The principle of my invention thereby results in an electrically driven power tool of relatively simple and economical construction, and which is capable of rapid and efficient operation. Inasmuch as the axial infeeding force is directed in precise axial alignment with the rotor and tool driving shaft, the accuracy of the cutting tool operation is greatly enhanced, and there are no transverse or lateral forces applied tending to displace or "cock" the drive shaft out of its normal axial position during operation, such as would otherwise be involved in the use of various tool shaft or spindle axial feeding mechanisms such as those involving the use of quills, worm and gear, rack and gear, lever and thrust collar, etc.

Furthermore, my invention eliminates additional mechanism heretofore required for retracting the rotary tool from the workpiece, such as levers, counter-weights, springs, etc.

It is a further object of my invention to provide a plurality of electric drive motors, each having an axially shiftable or floating rotor and drive shaft, each shaft directly mounting a rotary cutting tool, the multiple motors being mounted in spaced, opposed relationship with their drive shafts directed toward a common central point, whereby cutting operations can be simultaneously performed upon a single workpiece, such as involved in the drilling, counterboring or countersinking of a hole extending through a workpiece from opposite sides.

It is a further object of my invention to provide a unitary control means for applying the mechanical infeeding force to the multiple electric motor units, as above mentioned, together with readily adjustable means for determining both the infeed and outfeed limits of the oppositely mounted rotary cutting tools.

Still another object of my invention is to provide a work holding fixture or support midway between the oppositely mounted tools and drive motors, such fixture or support being horizontally and vertically adjustable in order to accommodate various sizes of workpieces.

Additional objects and advantages of my invention shall become apparent as the following description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings—

Fig. 1 is a top plan view of a device embodying the principle of my invention;

Fig. 2 is a front elevational view of Fig. 1;

Fig. 3 is a detailed, sectional view, taken substantially along line 3—3 of Fig. 1, and in the direction of the arrows, and showing the cutting tools, specifically drills, in operative position with respect to the exemplary workpiece;

Fig. 4 is a fragmentary view of an exemplary workpiece, such as the shank of a screw or bolt;

Figure 8:
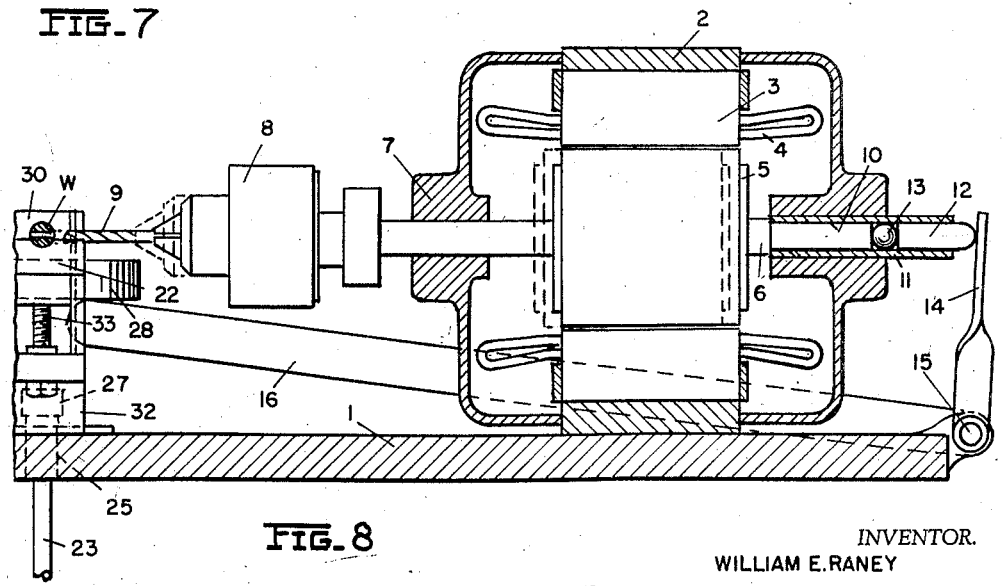
Fig. 8 is an enlarged, sectional view taken through one of the electric drive motors, and illustrating the respective operative positions of the rotor and tool carrying shaft.

Now referring first to Fig. 8, there are shown therein a base 1 and the electric motor 2 fixedly mounted thereon. The motor 2 comprises the stator, consisting of the stationary field poles 3 with windings 4, and the rotor 5 secured to and carried by the axially shiftable or floating drive shaft 6. One end of the shaft 6 is journaled in the motor housing bearing 7, and has the tool chuck 8 mounted upon its outer end in which a cutting tool 9 (such as the drill shown) is held. The other end of the drive shaft 6 has a reduced diameter portion 10 journaled in the bushing 11. A plunger 12 is mounted in the outer end of the bushing 11, with a ball bearing 13 mounted between the inner end of the plunger 12 and the outer end of the shaft portion 10.

The plunger 12 is adapted to be contacted with the lever arm 14 mounted on the rock shaft 15 which is in turn secured to the base 1. A second lever arm 16 is attached to the rock shaft 15, so that when the lever 16 is depressed, the lever 14 will turn in a counter-clockwise direction (with respect to Fig. 8), to apply an axial thrust upon the shaft 6, moving the latter, together with the tool 9, in a left-hand direction and against the solenoid effect of the field 3, which is normally exerted upon the rotor 5. Thus, the shaft 6 and tool 9 are given an axial infeeding movement with respect to the workpiece W, as indicated in dotted lines in Fig. 8, and when downward pressure upon the lever 16 is released, the solenoid effect of the motor immediately returns the rotor 5 and shaft 6 back to retracted position as indicated in full lines in Fig. 8.

It will be seen that as the rotor 5, shaft 6 and tool 9 move further in a left-hand direction, with the rotor 5 moving out of the zone of maximum flux of the field windings 4, that the driving torque thereby becomes reduced, thus resulting in a reduction in the rotary speed of the tool 9 the further or the deeper it is fed into the material being cut. This function automatically compensates for the increased heat generation which occurs at the tip or cutting edges of a rotary tool, such as a twist drill, when it enters deeper in the body of the workpiece, thus preventing overheating or "burning" of the cutting edges.

Now directing attention primarily to Figs. 1 and 2, the electric power tool unit of Fig. 8 is shown incorporated in a dual assembly, in which two electric drive motors 2 and 2', each having the axial shiftable rotors and drive shafts as previously described in connection with Fig. 8, are mounted in axial alignment on the base 1.

Although the motors 2 and 2' are shown in the accompanying drawings to be mounted with their drive shafts in a common axial line, it will be equally apparent to those skilled in the art that the motors can equally well be so disposed with respect to each other so that their shafts subtend an angle other than 180°, or are not disposed in the same horizontal plane, without departing from the spirit and scope of my invention. Likewise, more than two drive motors can be so mounted, the essential criterion of my invention being that they be mounted opposite to each other with their drive shafts converging toward a common central point or zone, to enable the cutting operations to be performed upon a common workpiece.

Each one of the motors 2 and 2' mount the rotary cutting tools 9 and 9', respectively, which in the illustrative instance are drills adapted to perform counterboring or countersinking operations upon the ends of the previously drilled hole 20 in the shank of the bolt W. (See Figs. 3 and 4.) The bolt or workpiece W is supported in the V-groove 21 on the top face of the supporting fixture 22 which is mounted upon the base 1 midway between the motors 2 and 2'.

The motor 2' has a plunger 12' in its outer shaft and, similar to the plunger 12 previously described. The lever arm 14', rock shaft 15' and lever arm 16' are adapted to move the shaft 6' of the motor 2' in a right-hand direction and toward the motor 2.

Figure 6:
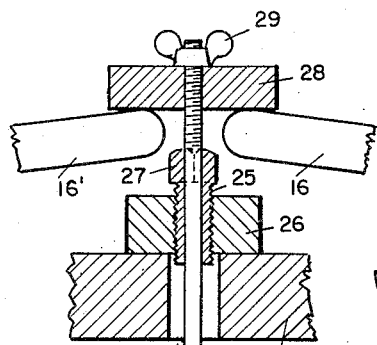
Fig. 6 is an enlarged, detailed sectional view taken along lines 6—6 of Fig. 5.
Figure 5:
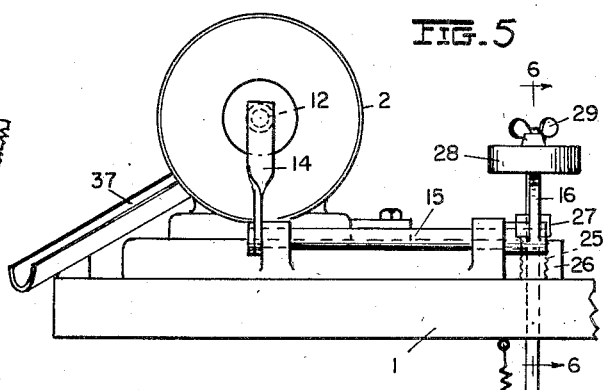
Fig. 5 is an end elevation of the device of Figs. 1 and 2, and extending below the base thereof, showing the assembly of the manually operated, tool infeed control means.
Figure 7:
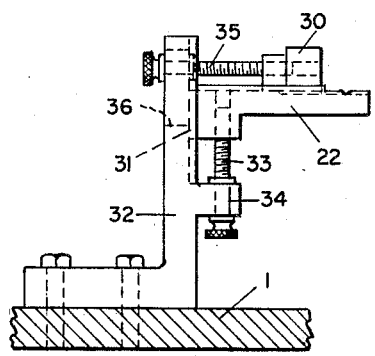
Fig. 7 is an enlarged, detailed side elevational view of the work supporting fixture.

The inner ends of the lever arms 16 and 16', as best shown in Fig. 6, terminate adjacent the vertical, centrally located control rod 23 which extends downwardly through the base 1 and has its lower end connected to the foot treadle 24, the latter preferably being mounted upon the floor where it can be conveniently actuated by the operator's foot. A guide bushing 25 for the control rod 23 is threadably mounted in the nut or block 26 and has a squared head 27 on its upper end. An abutment disc or washer 28 is adapted to contact the ends of the levers 16 and 16' and is threadably mounted on the top end of the control rod 23. A wing nut 29 also threadably engages the end of the rod 23 and serves as a lock nut for holding the abutment disc 28 in adjusted longitudinal position on the rod 23.

The work holding fixture comprises the horizontal arm 22 carrying the vertical block 30. The inner end of the arm 22 is slidably mounted in V-ways 31 in the face of the supporting bracket 32. An adjusting screw 33, journaled in the boss 34, regulates the supporting arm 22 to the desired height for supporting the workpiece. An adjusting screw 35, held against longitudinal movement in the vertical slot 36 in the bracket 32, in turn regulates the relative horizontal position of the block 30. Thus the work holding fixture may be easily adjusted to any desired vertical or horizontal position to accommodate various sizes of workpiece, such as the screw or bolt shank W shown in Figs. 3 and 4. A discharge chute 37 leads from a point just below the arm 22 to a point beyond the edge of the base 1, so that finished workpieces can be dropped therein and conveyed to a suitable receptacle.

The guide bushing 25 is set to a position corresponding to the limit of the desired infeed of the tools 9 and 9', and the abutment disc is threadably adjusted to a position on the rod 23 corresponding to the desired outfeed or retracted position of the tools 9 and 9', and locked in such position by the nut 29. Thus, the operation of my above-described device should be quite apparent. After a desired infeed and outfeed adjustment, and, of course, of the work supporting fixture, the workpiece is held by the operator upon the fixture, the foot treadle 24 depressed, motor shafts 6 and 6', and the tools 9 and 9' are urged inwardly toward each other to accomplish the desired cutting operation. Pressure upon the foot treadle 24 is then released and the solenoid effect exerted upon the rotors of the electric motors 2 and 2' then promptly retracts the shafts 6 and 6', together with the tools 9 and 9' to the original starting position.

The motors 2 and 2' are driven in an opposite direction with respect to each other, whereby the turning effect on opposite sides of the workpiece W, e. g., see Fig. 3, counter-balance each other, so that there is no resultant turning couple exerted upon the workpiece.

It will thus be seen that my above-described invention provides an economic, accurate, rapid and efficient power tool for operating cutting tools requiring both a rotary driving force and an axial thrust or feeding movement. Although twist drills have been shown in the accompanying drawings as the cutting tools employed in my device, it should be readily apparent to those skilled in the art, that equivalent tools such as reamers, counterbores, mills, chamfers, grinding wheels, and the like, may be substituted therefor, and hence are within the scope of my invention.

Other modes of applying the principle of the invention may be employed, change being made as regards the details described, provided the features stated in any of the following claims or the equivalent of such be employed.

I therefore particularly point out and distinctly claim as my invention:

1. A mechanism for axially feeding a power driven rotary cutting tool, comprising a rotary tool, such as a drill or the like, mounted on one end of an axially shiftable drive shaft, said shaft also forming the rotor shaft of an electric drive motor and being fixed to the motor rotor, the magnetic force generated in the drive motor during operation normally tending to hold said shaft in a given axial position, and manually operated means connected to said shaft for axially shifting the shaft and the motor rotor together with said tool into work cutting position and against such magnetic force.

2. A multiple spindle rotary tool mechanism wherein each tool is mounted on one end of an axially shiftable drive shaft, each of said drive shafts forming the rotor shaft of an electric drive motor and being fixed to the motor rotor, the magnetic force in such drive motors during operation normally tending to hold each of said shafts in a given axial position, and manually operable means engaging each of said shafts for axially shifting each shaft and the motor rotor attached thereto together with the tool, into work cutting position and against such magnetic force.

WILLIAM E. RANEY.